March 27, 1951  H. C. JOHANSEN  2,546,224
DEVICE FOR COUPLING AND UNCOUPLING DRILL ROD JOINTS
Filed Aug. 29, 1945  3 Sheets-Sheet 1
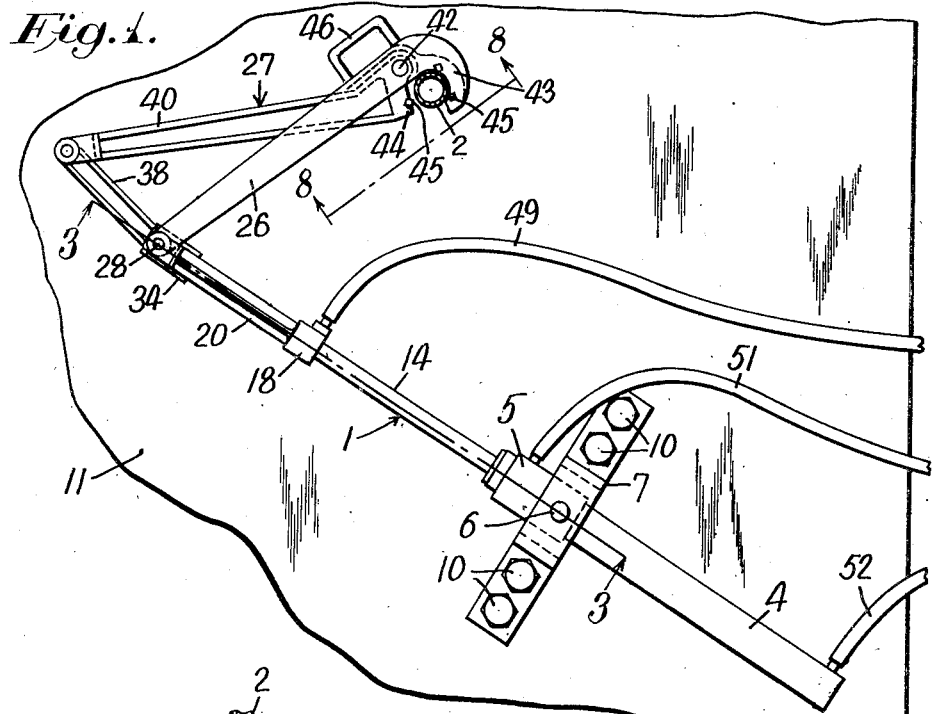
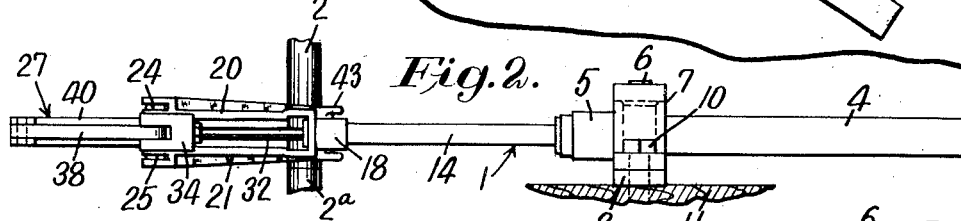
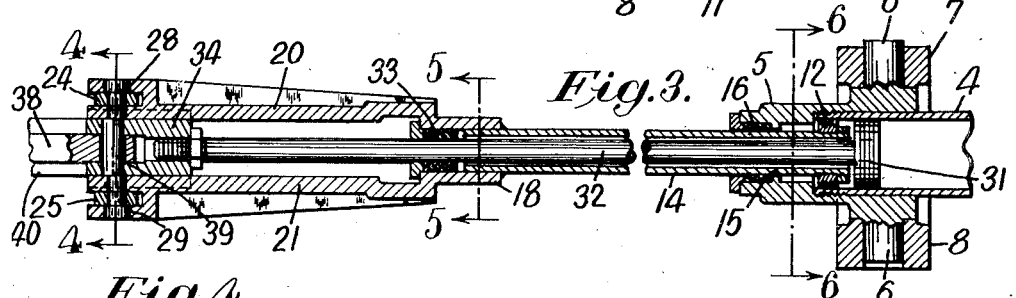
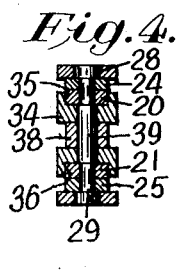
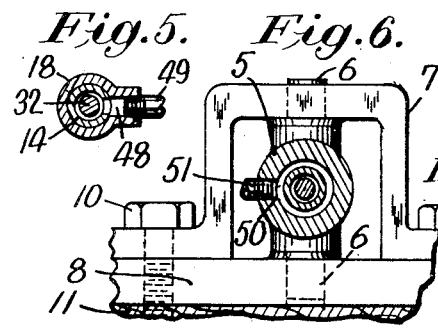
*Inventor:*
*Harry C. Johansen.*
*by Ralph C. Dustin*
*atty.*

March 27, 1951 H. C. JOHANSEN 2,546,224
DEVICE FOR COUPLING AND UNCOUPLING DRILL ROD JOINTS
Filed Aug. 29, 1945 3 Sheets-Sheet 2
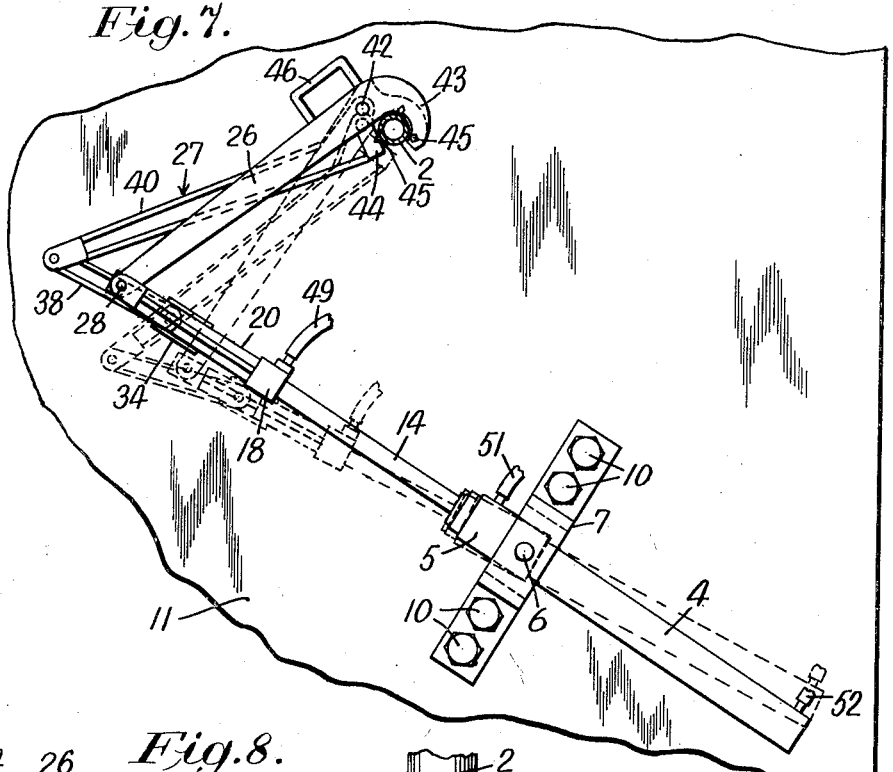
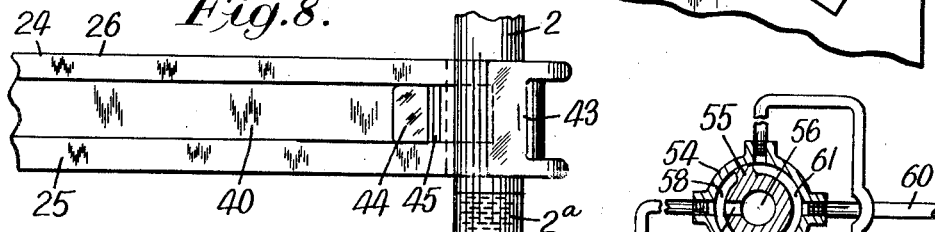
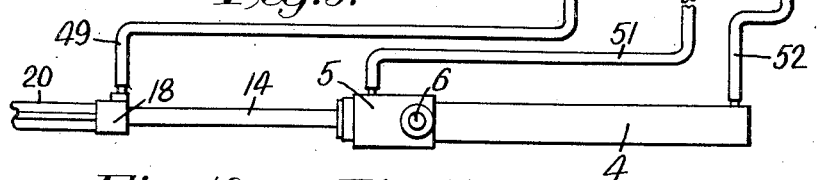
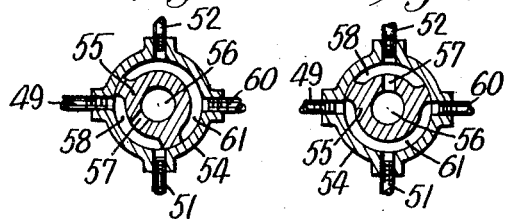
Inventor:
Harry C. Johansen.
by Ralph C. Dustin
Atty March 27, 1951     H. C. JOHANSEN     2,546,224
DEVICE FOR COUPLING AND UNCOUPLING DRILL ROD JOINTS
Filed Aug. 29, 1945     3 Sheets-Sheet 3
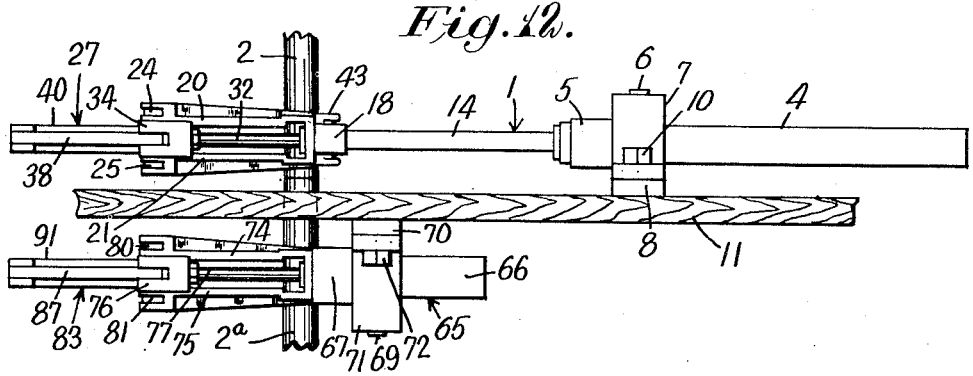
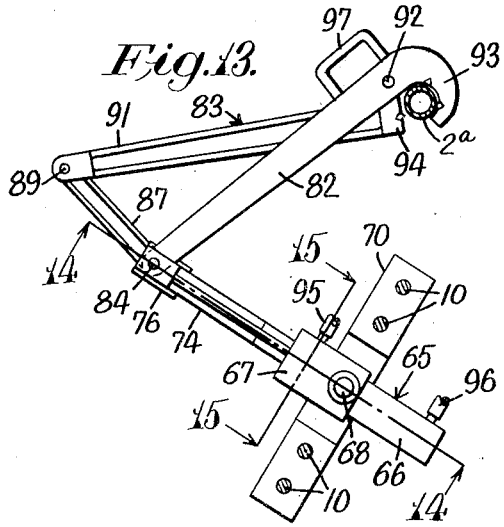
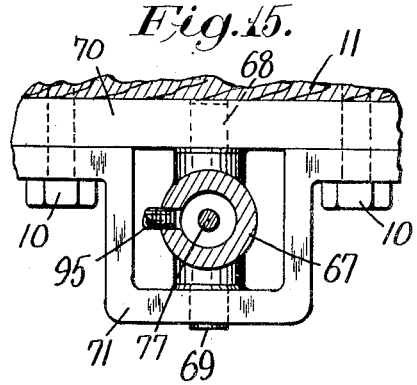
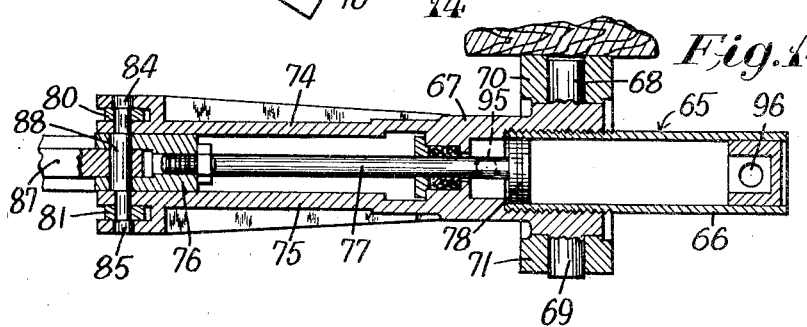
Inventor:
Harry C. Johansen.
by Ralph C. Dustin
Atty.

Patented Mar. 27, 1951

2,546,224

UNITED STATES PATENT OFFICE 2,546,224

DEVICE FOR COUPLING AND UNCOUPLING DRILL ROD JOINTS

Harry C. Johansen, Michigan City, Ind., assignor to Joy Manufacturing Company, a corporation of Pennsylvania Application August 29, 1945, Serial No. 613,383

12 Claims. (Cl. 255—35)

My invention relates to devices for making or breaking threaded couplings, and more particularly to power operated devices for coupling or uncoupling sections of pipe and the like.

Sections of drill rod or pipe are usually connected together by a threaded connecting means of one form or another. The coupling or uncoupling of these sections by a pipe wrench is slow and difficult as well as dangerous. It is therefore desirable that some form of a power operated means be provided for coupling or uncoupling such sections.

An object of my invention is to provide improved means for coupling and uncoupling sections of pipe and the like. Another object is to provide improved means for coupling and uncoupling threaded connections for sections of drill rod or pipe for oil wells. Yet another object is to provide an improved power operated device for rotating one section of pipe or the like relative to another section to effect a coupling or an uncoupling of the sections. Still another object is to provide improved power operated devices for making or breaking the threaded connections for sections of pipe or the like. Other objects of my invention will be pointed out in the accompanying description.

In the accompanying drawing there is shown for purposes of illustration one form which my invention may assume in practice.

In this drawing:

Fig. 1 is a plan view of my improved device for rotating a pipe section.

Fig. 2 is a side elevational view of the device shown in Fig. 1.

Fig. 3 is an enlarged longitudinal sectional view taken on the plane of the line 3—3 of Fig. 1.

Figs. 4, 5 and 6 are transverse sectional views taken, respectively, on the planes of the lines 4—4, 5—5, and 6—6 of Fig. 3.

Fig. 7 is a view like that of Fig. 1, but showing the device in different positions.

Fig. 8 is an enlarged side elevational view taken on the plane of the line 8—8 of Fig. 1.

Fig. 9 is a schematic diagram of the fluid supply system for the device of Fig. 1.

Figs. 10 and 11 are transverse sectional views of the valve control means for the fluid supply system and show the valve means in different positions.

Fig. 12 is a side elevational view of the device of Fig. 1 connected to one pipe section and of a fluid actuated holding device connected to an adjoining pipe section.

Fig. 13 is a plan view of the holding device of Fig. 12.

Fig. 14 is an enlarged sectional view taken on the plane of the line 14—14 of Fig. 13.

Fig. 15 is an enlarged transverse sectional view taken on the line 15—15 of Fig. 13.

Referring to the drawings it will be noted that there is shown in Figs. 1 to 9 a fluid actuated device, generally designated 1, for gripping and rotating a pipe section 2 which forms in this case a portion of a drill rod. The device 1 includes a cylinder member 4 connected at its forward end, as shown in Fig. 3, to a head member 5. Diametrically opposite trunnions 6, 6 formed on the head member 5 are pivotally received in openings in support members 7 and 8 which are fixed, as by screws 10, to a table or platform 11 having an opening through which the drill rod extends. Reciprocable within the cylinder member 4 is a piston 12 having a tubular piston rod 14 which extends forwardly through an opening 15 in the head member 5. A packing 16 is supported by the head member in engagement with the piston rod for preventing the escape of fluid from the cylinder member. The piston rod 14 is connected at its forward end, as by welding, to a frame 18 having leg portions 20 and 21 which are bifurcated at their forward ends to receive leg portions 24 and 25 of an arm 26 forming a portion of a tong, generally designated 27. The leg portions 24 and 25 of the tong arm are pivotally connected to the bifurcated portions of the legs 20 and 21 by pins 28 and 29.

Reciprocable within the cylinder member 4 is a second piston 31 having a piston rod 32 extending with substantial clearance through the tubular piston rod 14. A packing 33 is supported by the frame 18 in engagement with the piston rod 32 for preventing the escape of fluid through the clearance between the piston rods 14 and 32. The forward end of the piston rod 32 is threadedly connected to a member 34 having guideways 35 and 36 (Fig. 4) slidably receiving the leg portions 20 and 21 of the frame 18. The member 34 is forked at its forward end to receive one end of a link 38, and a pin 39 pivotally connects the link 38 to the forks of the member 34. The other end of the link 38 is pivotally connected to a tong arm 40 of a length substantially equal to the length of the arm 26 and which extends between the legs 24 and 25 of the arm 26 and is pivotally connected to the latter at 42. Formed on the arms 26 and 40 of the tong 27 are jaw portions 43 and 44 which are adapted to clamp the pipe section 2 when the arms are swung relative to each other about the pivot 42. Inserts 45 in the jaw portions 43 and 44 operate to grip the pipe firmly on the clamping of the jaws. A handle 46 is provided for positioning the tong 27 manually relative to the pipe 2.

The space in the cylinder member 4 between the pistons 12 and 31 is connected by the clearance space between the piston rods and a port 48 (Fig. 5) in the frame 18 in communication with a conduit 49. The space in the cylinder member at the forward side of the piston 12 is connected through a port 50 (Fig. 6) in the head member 5 in communicaton with a conduit 51, and the space in the cylinder member at the rearward side of the piston 31 is connected in communication with a conduit 52. The conduits 49, 51 and 52 are connected, as shown in Fig. 9, in communication with the interior of a valve casing 54 containing a rotatable valve member 55. Extending axially through the valve member is a fluid supply passage 56 which is connected by a port 57 in communication with a supply groove 58 formed in the periphery of the valve member. Opening into the interior of the valve casing is an exhaust conduit 60 which is adapted to be connected by an exhaust groove 61 in the valve member in communication with the conduits 49, 51 and 52.

To rotate the pipe section 2, the tong 27 is moved manually to a position in which the jaw portions 43 and 44 of the tong arms may grip the pipe section when the arms are swung relative to each other in a clamping direction. The pistons 12 and 31 will be in the positions shown in Fig. 3 when the jaws of the tong are open and the latter is in its gripping position. The valve member 55 is then rotated to the position shown in Fig. 9 so that fluid is supplied from the passage 56 through the port 57 and the groove 58 to the conduit 49 which conducts it to the clearance space between the piston rods 14 and 32 where it passes to the cylinder member 4 between the pistons and acts to force the piston 31 rearwardly in the cylinder member. Movement of the piston 31 rearwardly in the cylinder member causes the piston rod 32 to move to the right in Fig. 3 and pull the member 34 with it, the member 34 sliding at this time along the legs 20 and 21 of the frame 18. The link 38 moves with the member 34 and swings the arm 40 of the tong relative to the arm 26, causing the pipe section 2 to be firmly gripped. The valve member 55 is then rotated to the position shown in Fig. 10 for supplying fluid through the conduits 49 and 51 to the cylinder member to act on both of the pistons 12 and 31. Fluid acting on the piston 31 holds the tong clamped to the pipe section, and fluid acting on the piston 12 causes the frame 18 to move and swing the tong arm 26 for rotating the pipe section. The tong is then released and moved to a new gripping position by rotating the valve member 55 to the position shown in Fig. 11 so that fluid is vented from the forward sides of the pistons 12 and 31 through conduits 51 and 49, the exhaust groove 61 and the exhaust conduit 60, and is supplied to the rearward side of the piston 31 through the conduit 52. The trunnions 6, 6 permit the device 1 to swing into positions necessary for the free actuation of the tong, and into positions away from the pipe section when the tong is released. To rotate the pipe section 2 in the opposite direction it is only necessary to disconnect the support members 7 and 8 from the platform and invert the device 1. The support members are then connected to the platform in a position to support the tong so that it may grip the pipe.

While the pipe section 2 is being rotated, it is necessary that the adjoining pipe section, designated 2a in Fig. 12, be held against rotation. For holding the pipe section 2a against rotation, there is provided a fluid actuated device, generally designated 65. This device includes a cylinder 66 threaded at its forward end into an opening in a member 67 having diametrically opposite trunnions 68 and 69 rotatably received in openings formed in support members 70 and 71 attached, as by screws 72, to the lower surface of the table or platform 11. The member 67 is provided with forwardly projecting leg portions 74 and 75 which slidably support a forked member 76 connected by a piston rod 77 to a piston 78 reciprocably contained within the cylinder 66. The forward ends of the leg portions 74 and 75 are forked to receive leg portions 80 and 81 of an arm 82 forming a portion of a tong, generally designated 83. Pivot pins 84 and 85 connect the leg portions of the tong arm to the forks of the leg portions 74 and 75, as shown in Fig. 14. A link 87 is connected at one end by a pivot pin 88 to the forks of the member 76 and is connected at its other end by a pivot pin 89 to a tong arm 91 of a length substantially equal to the length of the arm 82 and extending between the leg portions of the arm 82 and pivotally connected to the latter at 92. Jaw portions 93 and 94 formed on the tong arms 82 and 91 act to grip the pipe section 2a when the arm 91 is swung in a counter-clockwise direction in Fig. 13 relative to the arm 82. Conduits 95 and 96 communicate with the forward and rearward ends of the cylinder 66 for conducting fluid relative to the latter under the control of valve means not shown. A handle 97 connected to the tong arm 82 provides for the manual adjustment of the tong relative to the pipe section 2a. It will be seen that the device 65 may be swung about the axes of the trunnions 68 and 69 to position the tong when it is disengaged from the pipe section.

The supply of fluid to the forward end of the cylinder through the conduit 95 and the exhaust of fluid from the rear end of the cylinder through the conduit 96 results in a movement of the piston 78 rearwardly in the cylinder to swing the tong arm 91 relative to the arm 82 and effect a clamping of the pipe section 2a. While the device 1 is operated to rotate the pipe section 2, the device 65 is held clamped to the section 2a. To release the device 65 it is only necessary to vent the forward end of the cylinder 66 and to supply fluid to the rear end of the cylinder.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. A coupling and uncoupling device comprising, in combination, a tong including pivotally connected arms having jaw portions for gripping a member to be rotated, and fluid actuated means and between which and said arms relative movement occurs during swinging of said arms for swinging said arms to effect a gripping and a rotating of said member, said fluid actuated means including a cylinder containing a pair of relatively movable pistons, means for respectively connecting said pistons to the outer ends of said arms, means for supplying fluid to said cylinder between said pistons for effecting a gripping action by said tong, and means for supplying fluid to one of said pistons for effecting, when said tong is effecting a gripping action, an actuation of said tong to rotate said member.

2. A coupling and uncoupling device comprising, in combination, a tong including pivotally connected arms having jaw portions for gripping a member to be rotated, and fluid actuated means operatively connected to the outer ends of said arms and between which and said arms relative movement occurs during swinging of said arms for swinging said arms to effect a gripping and a rotating of said member, said fluid actuated means including a cylinder containing a pair of relatively movable pistons, means including a tubular piston rod for connecting one of said pistons to the outer end of one of said tong arms, a piston rod extending through said tubular piston rod for connecting the other of said pistons to the outer end of the other of said tong arms, means for supplying fluid to said cylinder between said pistons for effecting a gripping action by said tong, and means for supplying fluid to one of said pistons for effecting, when said tong is effecting a gripping action, an actuation of said tong to rotate said member.

3. A coupling and uncoupling device comprising, in combination, a tong including pivotally connected arms having jaw portions for gripping a member to be rotated, and fluid actuated means for swinging said arms to effect a gripping and a rotating of said member, said fluid actuated means including a cylinder containing a pair of pistons, means including a tubular piston rod for connecting one of said pistons to one of said tong arms, a piston rod extending with substantial clearance through said tubular piston rod and connecting the other of said pistons to the other of said tong arms, means for supplying fluid through the space between said piston rods to said cylinder for actuating said pistons to effect a gripping action by said tong, and means for supplying fluid to one of said pistons for effecting, when said tong is effecting a gripping action, an actuation of said tong to rotate said member.

4. A coupling and uncoupling device comprising, in combination, a tong including pivotally connected arms having jaw portions for gripping a member to be rotated, fluid actuated means for actuating said tong and between which and said arms relative movement occurs during swinging of said arms, said fluid actuated means including a cylinder containing a pair of relatively movable pistons, means for respectively connecting said pistons to the outer ends of said tong arms, fluid conducting means communicating with the ends of said cylinder and with the space in said cylinder between said pistons, and means for connecting said fluid conducting means selectively to a fluid supply and exhaust.

5. A coupling and uncoupling device comprising, in combination, a tong including pivotally connected arms having jaw portions for gripping a member to be rotated, fluid actuated means for actuating said tong, said fluid actuated means including a cylinder containing a pair of pistons, means including a tubular piston rod for connecting one of said pistons to one of said tong arms, a piston rod extending with substantial clearance through said tubular piston rod for connecting the other of said pistons to the other of said tong arms, separate fluid conducting means communicating with the ends of said cylinder and, through the clearance between said piston rods, with the space in said cylinder between said pistons, and means for connecting said fluid conducting means selectively to a fluid supply and exhaust.

6. Coupling and uncoupling apparatus for jointed tool sections comprising, in combination, tongs including pivotally connected arms having jaw portions for gripping adjacent tool sections, means for actuating one of said tongs to effect a gripping and holding of its tool section, said last mentioned means including a cylinder containing a piston, means for connecting said piston to the outer end of one arm of said one of said tongs, means for connecting said cylinder to the outer end of the other arm of said one of said tongs, and means for supplying fluid to said piston, means for actuating the other of said tongs to effect a gripping and a rotating of its tool section, said last mentioned means including a cylinder containing a pair of relatively movable pistons, means for connecting said pair of pistons to the outer ends of the arms of said other tong, means for supplying fluid to said last mentioned cylinder between said pistons to move one piston relative to the other for effecting a gripping action by said other tong, and means for supplying fluid to one of said pair of pistons for effecting, when said other tong is effecting a gripping action, an actuation of said other tong to rotate its tool section.

7. A coupling and uncoupling device comprising, in combination, a tong including pivotally connected, relatively swingable lever arms of substantially equal length and each provided at its inner end with a jaw portion for gripping a member to be rotated, power operated means including power devices respectively operatively connected to the outer ends of said lever arms, and means for controlling the flow of power medium to said power devices of said power operated means and positionable first to effect operation of one of said power devices for swinging one lever arm relative to the other to cause said jaw portions to grip the member to be rotated and thereafter to effect operation of both of said power devices to swing said lever arms in unison to effect rotation of the member gripped by said jaw portions.

8. A coupling and uncoupling device comprising, in combination, a tong including pivotally connected, relatively swingable lever arms of substantially equal length and each provided at its inner end with a jaw portion for gripping a member to be rotated, power operated means including power devices respectively operatively connected to the outer ends of said lever arms, and means for controlling the flow of power medium to said power devices of said power operated means and positionable first to effect operation of one of said power devices for swinging one lever arm relative to the other to cause said jaw portions to grip the member to be rotated and thereafter to effect operation of both power devices to swing said lever arms in unison to effect rotation of the member gripped by said jaw portions, said power devices including relatively movable power actuated elements arranged in coaxial relation, one element operatively connected to each lever arm, and said controlling means including a control device for controlling the flow of power medium to said power actuated elements to effect movement of one element relative to the other or movement of said elements in unison to effect the functions specified.

9. A coupling and uncoupling device comprising, in combination, a tong including pivotally connected, relatively swingable lever arms of substantially equal length and each provided at its inner end with a jaw portion for gripping a member to be rotated, power operated means including power devices respectively operatively connected to the outer ends of said lever arms, and means for controlling the flow of power medium to said power devices of said power operated means and positionable first to effect operation of one of said power devices for swinging one lever arm relative to the other to cause said jaw portions to grip the member to be rotated and for thereafter operating both power devices to swing said lever arms in unison to effect rotation of the member gripped by said jaw portions, said power devices each comprising a fluid actuated piston, said pistons being relatively movable and one piston operatively connected to each lever arm, and said controlling means including control valve means for controlling the flow of pressure fluid to said pistons for effecting relative movement between said pistons or movement of said pistons in unison to effect the functions specified.

10. A coupling and uncoupling device comprising, in combination, a tong including pivotally connected, relatively swingable, elongated lever arms of substantially equal length and each provided at its inner end with a jaw portion for gripping a member to be rotated, power operated means supported at a fixed point independently of said lever arms and relative to which said lever arms are swingable, said power operated means including power devices respectively operatively connected to the outer ends of said lever arms, and controlling means for said power operated means including a control device for controlling the flow of power medium to said power devices and positionable to first operate one of said devices to effect relative swinging movement between said lever arms to cause said jaw portions to grip the member to be rotated and to thereafter operate both of said power devices to effect swinging of said lever arms in unison for rotating the member gripped by said jaw portions.

11. A coupling and uncoupling device comprising, in combination, elongated relatively movable lever arms of similar length each having a jaw portion at its inner end for gripping the member to be rotated and pivotally connected together near the jaw portions thereof, power operated means including relatively movable power devices respectively operatively connected to the outer ends of said lever arms, and controlling means for controlling the flow of power medium to said power devices and positionable first to effect operation of one of said power devices to effect relative swinging movement between said lever arms to cause said jaw portions to grip the member to be rotated and thereafter to effect operation of both of said power devices for swinging said lever arms in unison to rotate the member gripped by said jaw portions.

12. A coupling and uncoupling device comprising, in combination, a tong including pivotally connected lever arms having at their inner ends jaw portions for gripping a member to be rotated, fluid actuated means including fluid actuated devices respectively operatively connected to the outer ends of said lever arms and relative to which said arms are movable during swinging of said arms, and controlling means for said fluid actuated means for controlling flow of pressure fluid to said fluid actuated devices and positionable first to effect swinging of one lever arm relative to the other to cause said jaw portions to grip the member to be rotated and thereafter, while said jaw portions are held in gripping relation with the member to be rotated, to effect swinging of said lever arms in unison to rotate the member gripped by said jaw portions.

HARRY C. JOHANSEN.

REFERENCES CITED

The following references are of record in the file of this patent:

UNITED STATES PATENTS

| Number | Name | Date |
|---|---|---|
| 1,401,405 | Hole | Dec. 27, 1921 |
| 1,615,695 | Grattan | Jan. 25, 1927 |
| 1,736,009 | Nixon | Nov. 19, 1929 |
| 2,311,225 | Grable | Feb. 16, 1943 |